(12) United States Patent
Beck et al.

(10) Patent No.: US 6,382,946 B1
(45) Date of Patent: May 7, 2002

(54) MOLDING MULTI-LAYERED ARTICLES USING COINJECTION TECHNIQUES

(75) Inventors: Martin H. Beck; George F. Rollend, both of Amherst; John H. Muszynski, Auburn, all of NH (US)

(73) Assignee: DTL Technology Limited Partnership, Amherst, NH (US)

( * ) Notice: Subject to any disclaimer, the term of this patent is extended or adjusted under 35 U.S.C. 154(b) by 0 days.

(21) Appl. No.: 09/053,594

(22) Filed: Apr. 1, 1998

(51) Int. Cl.[7] .......................... B29C 45/16; B29C 45/22
(52) U.S. Cl. .................... 425/130; 264/241; 264/328.8; 425/572; 425/566
(58) Field of Search .............................. 264/241, 328.8; 425/562, 564, 566, 572, 561, 130

(56) References Cited

U.S. PATENT DOCUMENTS

| | | | |
|---|---|---|---|
| 3,740,180 A | 6/1973 | Sidur | 425/249 |
| 4,124,308 A | 11/1978 | Sokolow | 366/77 |
| 4,141,470 A * | 2/1979 | Schulte et al. | 222/137 |
| 4,239,732 A * | 12/1980 | Schneider | 422/133 |
| 4,390,332 A | 6/1983 | Hendry | 425/4 R |
| 4,416,608 A | 11/1983 | Deardurff | 425/548 |
| 4,550,043 A | 10/1985 | Beck et al. | 428/36 |
| 4,710,118 A | 12/1987 | Krishnakumar et al. | 425/130 |
| 4,715,802 A | 12/1987 | Arai | 425/130 |
| 4,726,751 A | 2/1988 | Snibata et al. | 425/144 |
| 4,752,199 A | 6/1988 | Arai | 425/130 |
| 4,761,343 A | 8/1988 | Gellert | 425/547 |
| 4,784,819 A | 11/1988 | Spurr | 264/328.19 |
| 4,808,101 A | 2/1989 | Schad et al. | 425/130 |
| 4,863,665 A | 9/1989 | Schad et al. | 264/255 |
| 4,950,143 A | 8/1990 | Krishnakumar et al. | 425/130 |
| 5,040,963 A | 8/1991 | Beck et al. | 425/130 |
| 5,043,129 A * | 8/1991 | Sorenson | 264/297.2 |
| 5,069,840 A | 12/1991 | Arnott | 264/69 |
| 5,098,274 A | 3/1992 | Krishnakumar et al. | 425/133.1 |
| 5,112,212 A | 5/1992 | Akselrud et al. | 425/557 |
| 5,143,733 A | 9/1992 | Von Buren et al. | 425/130 |
| 5,200,207 A | 4/1993 | Akselrud et al. | 425/557 |
| 5,221,507 A | 6/1993 | Beck et al. | 264/255 |
| 5,232,710 A | 8/1993 | Miyazawa et al. | 425/130 |
| 5,445,781 A * | 8/1995 | Addeo et al. | 264/328.6 |
| 5,656,210 A * | 8/1997 | Hill et al. | 264/2.6 |
| 5,833,899 A | 11/1998 | Wunderlich | 264/40.4 |
| 5,891,381 A * | 4/1999 | Bemis et al. | 264/328.8 |
| 5,897,822 A | 4/1999 | van Manen et al. | 264/255 |
| 5,922,363 A * | 7/1999 | Beck et al. | 425/130 |
| 6,322,767 B1 * | 12/2001 | Kudert et al. | 425/130 |

* cited by examiner

*Primary Examiner*—Robert Davis
*Assistant Examiner*—Emmanuel Luk
(74) *Attorney, Agent, or Firm*—Davis & Bujold, P.L.L.C.

(57) ABSTRACT

A multi-cavity coinjection mold and method for simultaneously producing a plurality of multi-layered articles comprising: a mold structure defining a plurality of mold cavities; a first supply source for supplying metered amounts of a first molding material; a second supply source for supplying metered amounts of a second molding material; a hot runner system in communication with the first and second supply sources for conveying the metered amounts of the first and the second materials separately to a region proximate each of the cavities; the region comprising having a pin controlled passage leading to proximate cavity by way of a gate having the same cross-section as the passage, the pin scavenging material from the passage and providing cavity packing.

14 Claims, 5 Drawing Sheets

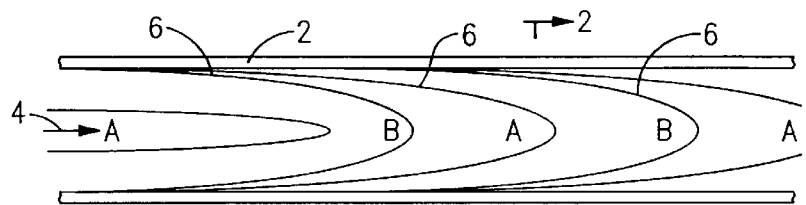
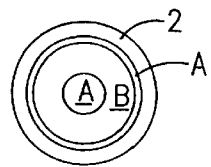
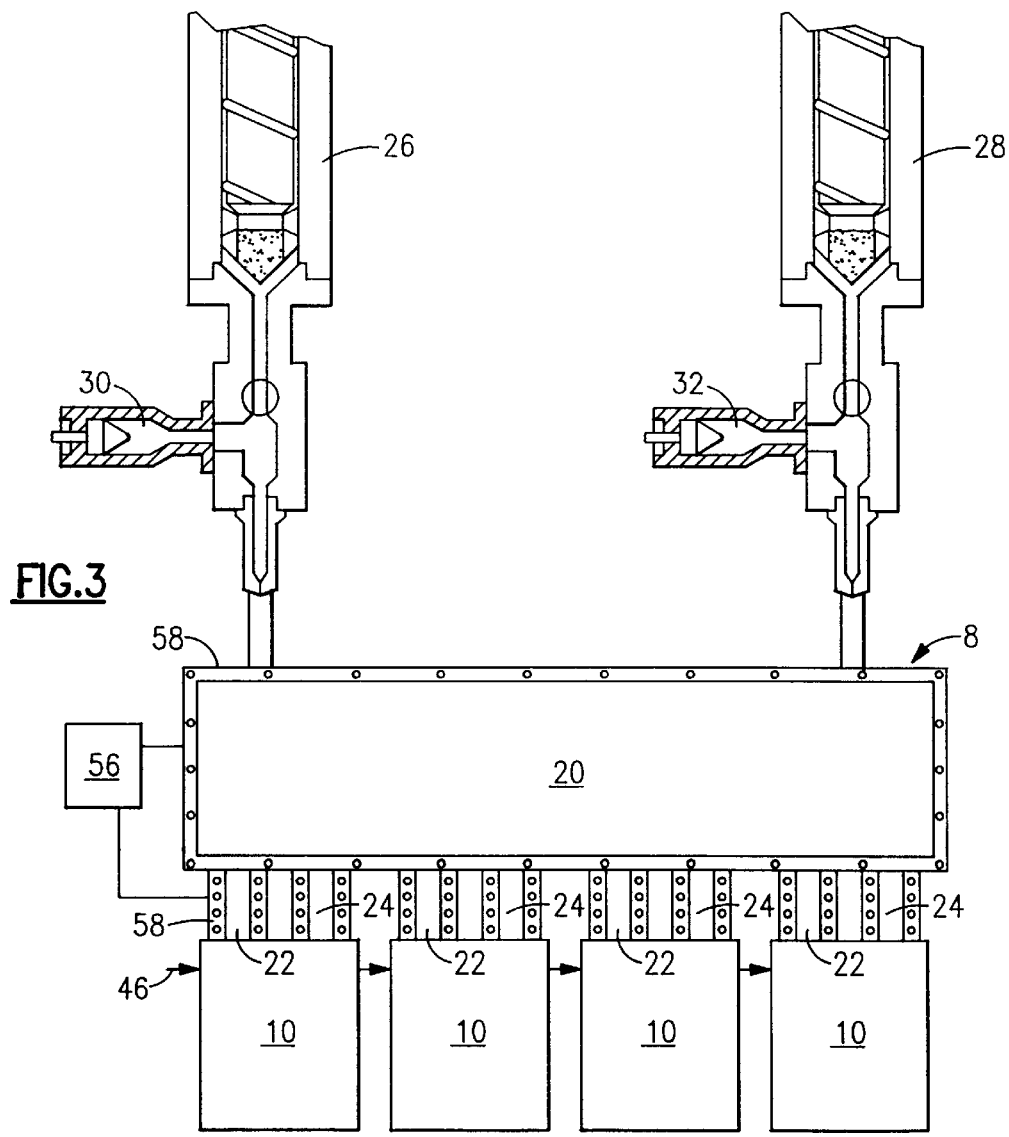

MOLDING MULTI-LAYERED ARTICLES USING COINJECTION TECHNIQUES

FIELD OF THE INVENTION

This invention relates generally to coinjection molding and particularly relates to an improved apparatus for molding multi-layered articles which minimizes the effects of wall friction on contiguously flowing injection molding materials for supply to injection molding cavities.

DEFINITIONS

As used herein:

"First and second materials" is intended to cover at least two materials which are sequentially supplied to an injection mold, it being entirely possible that one or more other materials may be sequentially supplied before, between, or after the first and second materials;

"Balanced Hot Runner" is a temperature controlled heated uninterrupted material conveying system extending from a single input (e.g. a material source or metering valve) to a plurality of outputs (e.g. metering valves or injection mold cavities) comprising a single passage branched into a plurality of passages with each of said plurality of passages, communicating with one of the plurality of outputs, for conveying material therethrough to simultaneously supply equal quantities of the material to each of the outputs;

"Unbalanced Hot Runner" is a temperature controlled heated material conveying system, for the passage of material from an input (e.g. material supply source) to a plurality of outputs (e.g. metering valves for metering the material for supply of metered quantities of the material to injection mold cavities), which is not branched to provide passages of identical cross-section and length and does not divide the supplied material into equal quantities for the simultaneous supply of these quantities each to one of outputs.

BACKGROUND OF THE INVENTION

The manufacture of pure, or virgin, resin preforms for blow molding containers is well known within the prior art. But since the advent of recycling, it is now possible to manufacture preforms with materials that are compositionally less pure than virgin materials. Such degraded, or recycled, materials not only yield positive environmental benefits in an ecologically fragile era but provide manufacturers with an alternative manufacturing method which allows for substantial reductions in costs.

But, since recycled materials are obtained from post consumer solid waste, certain new manufacturing problems have been encountered that were heretofore previously unknown. For example, manufacturers must now provide, at increased costs, additional equipment for keeping the virgin and recycled materials separate from each other. In addition, multi-layered articles, such as preforms, that are eventually used to form containers for food stuffs, have even further impediments by way of rigid statutory guidelines. The guidelines, enacted by the Food and Drug Administration (FDA), require that certain minimums must be met, or exceeded, before the containers can be approved as "qualified" to contain food stuffs and before the foods are allowed to be distributed to the consumer population. One extremely noteworthy FDA provision enacted theretowards provides for the assurance of product "cleanliness".

Currently, in order to meet the FDA cleanliness standards, a container must be configured such that only surfaces of virgin materials contact the foods and beverages therein. Other container surfaces, such as areas for contacting the human mouth, e.g. the dispensing orifice on a soda container, also require virgin material surfaces. As a result, it is economically desirable to provide manufacturers with a apparatus capable of utilizing recycled materials within containers while, at the same time, preventing recycled materials from contacting the very foods and liquids that are to be distributed to, and consumed by, the public.

Some advances towards the aforementioned goal have been attained by using coinjection molding techniques to manufacture multi-layered containers. The multi-layered containers thence produced have interior and exterior surfaces of the container comprised of virgin materials while the fill and support materials located within the interior of the container walls comprise the degraded, less than pure, recycled materials. Consequently, the economies and conservation of utilizing recycled materials is thereby achieved while simultaneously meeting the strict FDA statutory requirements.

Prior art coinjection molding techniques that produce the multi-layered containers described above, often first manufacture a multi-layered preform and then blow mold the preform into the final container. The formation of multi-layered containers are described in detail, for example, in Applicant's U.S. Pat. Nos. 4,550,043 and 5,221,507.

Typically, the preforms are injection molded in multi-cavity molds which may have as many as 96 cavities. These preforms are then simultaneously produced by injecting appropriate amounts of a first and second material, i.e. virgin and recycled, into each of the cavities. To this end, the mold defines a manifold arrangement to convey the two materials to each of the singular cavities. Such an arrangement, as in Applicant's prior patents, is known to convey each of the first and second materials into a singular hot runner before contiguously conveying the materials to the cavities. The combination then allows for a reduction in equipment costs due to the singular hot runner arrangement. The singular conduit repeatedly divides the materials flowing therein into a plurality of flow paths for delivery to each cavity and to thereby ultimately provide each cavity with a substantially equal amount of metered material at substantially the same temperature and at substantially the same time as every other cavity. Yet, with mold arrangements containing large numbers of cavities, such as with forty-eight and ninety-six cavities, the two materials contiguously flowing within a singular conduit have been known to have interface boundary problems between the virgin and recycled materials when conveyed over lengthy distances.

FIG. 1 illustrates potential interface boundary problems encountered with sequentially and contiguously flowing materials A and B in singular conduit 2. Flow is in the direction of arrow 4 with overlapping tails 6 lagging the core flow of the materials to such an extent that a transverse cross-section (FIG. 2) of the flowing materials may contain two or more layers in a radial material distribution A-B-A (or even A-B-A-B or more) of materials A and B in lengthy conduits. This. problem complicates the injection molding of preforms for blow molding containers meeting the aforementioned FDA requirements in multi-cavity mold constructions utilizing contiguously flowing material distribution systems.

Other prior art multi-cavity mold apparatus, that use coinjection molding to form multi-layered preforms, utilize molds in which a completely separate manifold system for each material, i.e. virgin and recycled, is used to separately convey that specific material to the singular cavities. The separate materials are then injected sequentially into the cavities utilizing a valve arrangement closely adjacent each cavity to control the flow from the separate manifolds into multi-orifice nozzles. Such arrangements result in molds that are expensive and complex.

OBJECTS AND SUMMARY OF THE INVENTION

It is an object of the present invention to provide a more distinct division between the recycled and pure materials being contiguously conveyed within the same conduit to the individual mold cavities in order to more accurately provide a substantially equivalent amount of molding materials to each cavity.

It is also an object of the present invention to provide a method and apparatus that yields a delivery method for a first and second material that delivers the respective materials at substantially the same temperature and at reduced costs while conveying substantially equal amounts of the respective materials at substantially simultaneous delivery times.

SUMMARY OF THE INVENTION

According to the invention, there is provided a multi-cavity coinjection mold for simultaneously producing a plurality of multi-layered articles comprising: a mold structure defining a plurality of mold cavities; a first supply source for supplying a first molding material; a second supply source for supplying a second molding material; a hot runner system in communication with said first and second supply sources for conveying timed metered quantities of said first and said second materials separately to a region proximate each cavity; and each said region comprising a contiguous gate and adjacent passage with a reciprocal pin closely housed in the passage for movement between a fully retracted position, in which the first and second materials are conveyed contiguously through said passage and said gate to the proximate cavity, and a gate closure position, in which the pin has ejected all of the first and second materials from the passage into the proximate cavity, the passage and gate having the same cross-section and size without restriction therebetween.

Also according to the invention, there is provided a multi-cavity coinjection mold for simultaneously producing a plurality of multi-layered articles comprising: a mold structure defining a plurality of mold cavities; a first supply source for supplying a first molding material; a second supply source for supplying a second molding material; a hot runner system in communication with said first and second supply sources for conveying said first and said second materials separately to a region proximate each cavity; a valve mechanism per cavity for receiving said first and said second materials from said hot runner system and for sequentially supplying desired quantities of said first and said second materials contiguously to a hot runner to a region proximate each cavity, wherein each hot runner communicates with a single cavity only; and each said region comprising a contiguous gate and adjacent passage with a reciprocal pin closely housed in the passage for movement between a fully retracted position, in which the first and second materials are conveyed contiguously through said passage and said gate to the proximate cavity, and a gate closure position, in which the pin has ejected all of the first and second materials from the passage into the proximate cavity, the passage and gate having the same cross-section and size without restriction therebetween.

Also according to the invention, there is provided a method of multi-cavity coinjection molding for simultaneously producing a plurality of multi-layered articles comprising: a) providing a mold structure defining a plurality of mold cavities; b) providing a first supply source for supplying a first molding material; c) providing a second supply source for supplying a second molding material; d) separately conveying said first and second materials through a hot runner system from said first and second supply sources to convey timed metered quantities of said first and said second materials separately to a region proximate each cavity; wherein each said region comprising a contiguous gate and adjacent passage with a reciprocal pin closely housed in the passage, the passage and gate having the same cross-section and size without restriction therebetween; and e) and moving the pin between a fully retracted position, in which the first and second materials are conveyed contiguously through said passage and said gate to the proximate cavity, and a gate closure position, in which the pin has ejected all of the first and second materials from the passage into the proximate cavity.

BRIEF DESCRIPTION OF THE DRAWINGS

The invention will now be described, by way of example, with reference to the accompanying drawings, in which:

FIGS. 1 and 2 illustrate the distribution of contiguously flowing materials A and B in a relatively long conduit;

FIG. 3 is a diagrammatic cross-section of a multi-cavity coinjection mold system according to one embodiment of the invention;

DETAILED DESCRIPTION OF THE PREFERRED EMBODIMENTS

Figure 4:
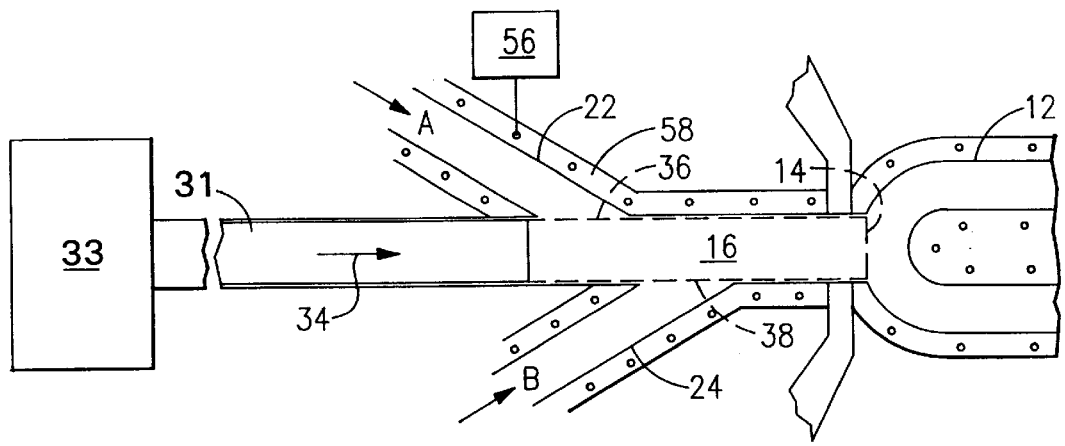
FIGS. 4, 5, 6, 7 and 8 are diagrammatic views of cavity arrangements having passage and pin arrangements associated with a mold cavity, according to variations of the invention.

With reference to the embodiment of FIG. 3, a cavity mold 8 for the sequential coinjection molding of multi-layered preforms for the blow molding of multi-layered containers comprising interior and exterior surfaces of a virgin material, e.g. polyethylene terephthalate (PET) is illustrated as having four cavity arrangements 10. It will be appreciated by those skilled in the art that, in practice, the multi-cavity mold 8 depicted may have a greater number of cavities including both odd (e.g. 71) or even (e.g. 96) numbers. Four cavity arrangements 10 are used in this example to simplify explanation of the present invention which is applicable to molds having any number of cavities. Each cavity arrangement comprises a cavity 12 (e.g. FIG. 4) of a form is itself well known to those skilled in the art and is not described in detail herein. At the base of each cavity is a gate 14 through which passes the materials which will form the preform in that particular cavity. The particular gate cross section is a function of the properties of materials conveyed and of how much material is to be injected. All of which are well known within the art.

The mold 8 defines a plurality of hot runner passages 16 (e.g. FIG. 4) each for conveying timed sequential quantities of alternating first and second molding materials contiguously and simultaneously to all cavities.

In operation, each passage 16, receives first and second materials through a hot runner manifold system 20 by way of hot runners 22, 24. The first and second materials (A and B) are supplied by plasticizers 26 and 28 under control of ram pots 30 and 32, respectively. So that the two materials are sequentially supplied in timed metered quantities through the passages 16 of the associated cavity (FIG. 4).

An example of a cavity arrangement 10 is diagrammatically illustrated in FIG. 4 in which one only of a plurality of cavities 12 of a multi-cavity mold is shown, the other cavities being identical as to form and material supply arrangements. In this embodiment an essentially nozzleless material supply arrangement is provided in that material A and B reach the gate 14 through a passage 16 of the same cross-section and size as the gate 14, without the reduction in cross-section inherent in a nozzle such as the nozzles of the prior art. Hereinafter in this preferred description, the preferred cross-section of passage and gate as being circular will be referred to.

In this embodiment materials A and B are separately and sequentially conveyed through hot runners 22, 24 in timed metered quantities to passage 16 through which they are conveyed contiguously to and through gate 14 to cavity 12 for the coinjection molding of a multilayer preform as previously described.

A pin 30 is reciprocally mounted in passage 16 and is shown in full in its retracted position and in ghost in its gate closure position. The pin is cylindrical and has a diameter about 0.0005 inches (0.013 mm) to about 0.001 inches (0.025 mm) less than the diameter of passage 16 and gate 14.

Friction of the materials A and B contiguously flowing through passage 16 causes the interfaces of materials in passage 16 to form tails adjacent the wall of passage 16 which lag the more centrally located core portions of the interfaces. These tails are undesirable as they have a potential of adversely affecting material distribution in the preform produced in the cavity 12. The further the materials are contiguously conveyed, the worse is the adverse effect. In the embodiment of FIG. 4, the adverse effect of the tails is minimized as a result of the materials A and B being separately supplied to passage 16 and the passage 16 being kept as short as possible with the consequence that the contiguous contact of materials A and B is minimized with the consequent minimization of the tails.

When the metered quantities of materials A and B, for injection molding a preform, have been conveyed to the passage 16 and cavity 12, the passage 16 is full. At this time, the pin 30 is moved by actuator 32 in the direction of arrow 34 to drive the material remaining in passage 16 through the gate 14 to completely fill the cavity 12 with the pin 30 then closing the gate 14. By this means, the pin 30 ejects all material from passage 16 and thus eliminates all residual tails which would otherwise remain pending the next molding cycle. With the pin 30 in this position, the cavity is full. The pin 30 then is applying and continues to apply a packing pressure (produced by actuator 32) to the material in the cavity 12 while that material is solidifying, thereby to ensure complete filling of the cavity 12 and formation of a complete preform therein. The pin 30 remains in this position until the next molding cycle is about to commence, at which time the pin 30 is withdrawn by actuator 32 to its fully retracted position with ports 36 and 38 fully open for the conveyance, in timed metered sequence, of materials A and B to passage 16. It should be noted that pin 30 does not control flow of either material A and B to passage 16 as these materials are only supplied to passage 16 while the pin 30 is fully retracted.

It will be appreciated that while hot runners 22, 24 only for materials A and B (e.g. virgin and recycled PET) are shown, the provision of hot runners for the timed metered supply of a third (e.g. a barrier material) material etc. could be provided within the scope of the invention. Also while the hot runners 22, 24 are shown as ported into the side of passage 16, annular or other port configurations could be used.

Figure 5:
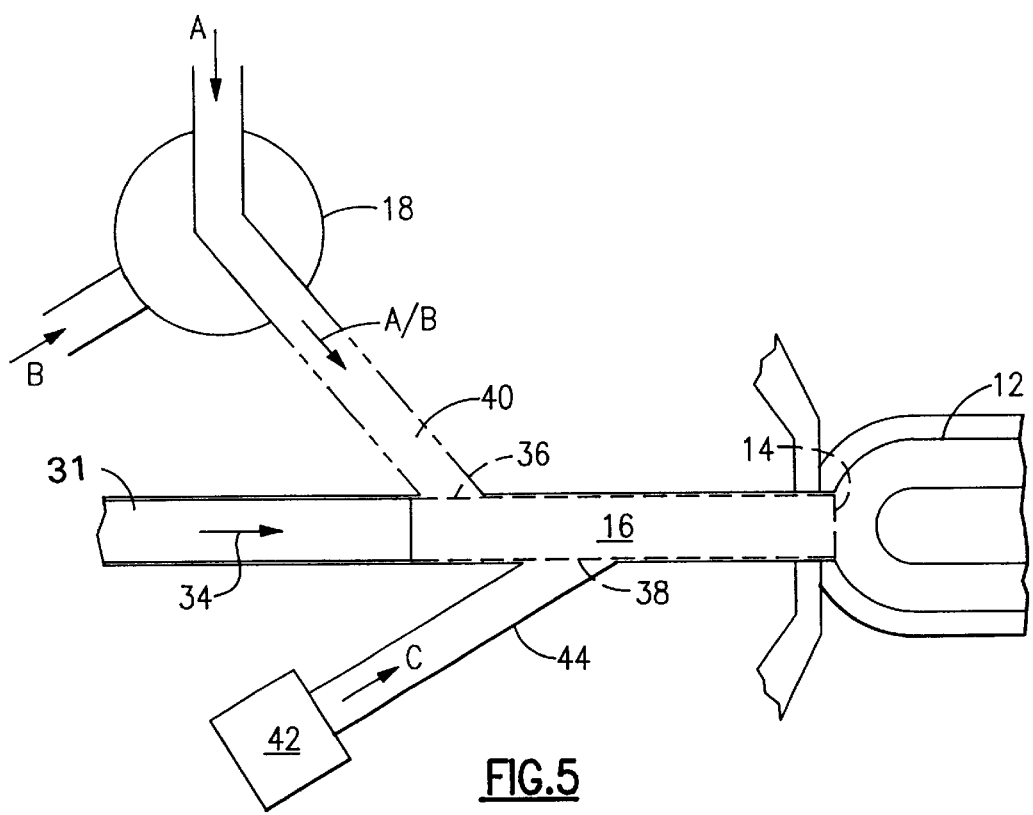

Referring now to FIG. 5 which illustrates a variation of the embodiment of FIG. 4, only distinguishing features will be described. Here a timed valve mechanism 18, hereinafter described in more detail, supplies metered quantities of materials A and B, from hot runner systems 20 (balanced or unbalanced) for contiguous conveyance to passage 16 by way of hot runner 40, where this contiguous supply of materials A and B is sequenced with a timed metered supply of material C (e.g. a barrier material) from a further material supply source 42 by way of hot runner 44 for the contiguous supply of materials A, B and C in a desired sequence through gate 14 to cavity 12.

Figure 6:
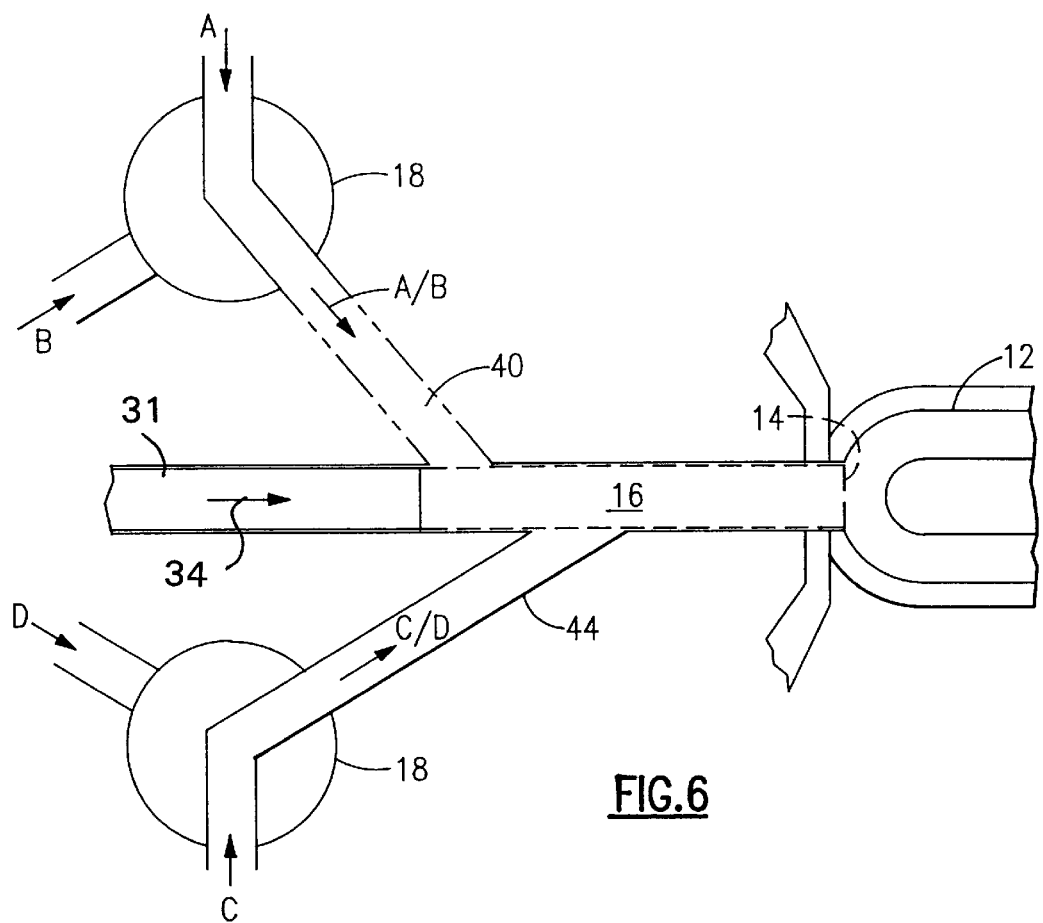

It will be appreciated that a further timed valve mechanism 18 (FIG. 6), could be employed to provide a contiguous supply of materials (e.g. C and D or C with A or B, etc.) in place of the metered supply of material C.

The valve mechanisms. 18 are as closely adjacent their respective cavities 12 as possible. It will be appreciated that separate conveyance of the first and second materials to the valve mechanisms proximate their respective cavities will minimize any interface boundary difficulties between the first and second materials since the two materials are not contiguous within a singular conduit prior to reaching the valve mechanisms. Once combined by the valve mechanisms 18, the distance traveled by the contiguous first and second materials within the hot runners 40, 44 and passages 16 is minimal and the difficulties of lengthy contiguous travel are minimized. Simultaneously, equipment cost advantages are realized since each hot runner 40, 44 is a single undivided channel dedicated to a single cavity. In addition, hot runner manifold system 20 need not be a balanced conveyance system.

Timing control mechanism 46 facilitates the coordination of simultaneous switching of the plurality of valve mechanisms 18 so that substantially equal amounts of the materials will be supplied simultaneously to each individual cavity 12. Actuators 32 and timing mechanism 46 may be any one of a variety of electromechanical mechanisms as will be well known to those skilled in the art and will not be described here in detail.

Further construction details of mold 8, particularly its hot runners, together with the heating and cooling arrangements therefore are also conventional within this technology and will be readily apparent to those skilled in the art. Likewise, the plasticizers and ram pots are of conventional construction as are the general engineering details of valve mechanisms. Accordingly, these matters are again not described herein. in detail.

It will be further appreciated by those skilled in the art that the separate and distinct hot runners 22, 24 may be used to convey different materials from respective plasticizers 26 and 28 wherein the materials supplied from the plasticizers are of substantially different processing temperatures. Such an alternative arrangement, while providing distinct hot runners for materials. of differing temperatures, may also be used if the materials are of the same processing temperature. The conveyance of the specific materials are kept separate until conveyed to the appropriate proximate cavity regions.

Conveyed first and second materials are then likewise supplied to a timed valve distribution system 18 for combining the materials into hot runners 40, passages 16 and eventually to the appropriate individual cavities 12.

Figure 7:
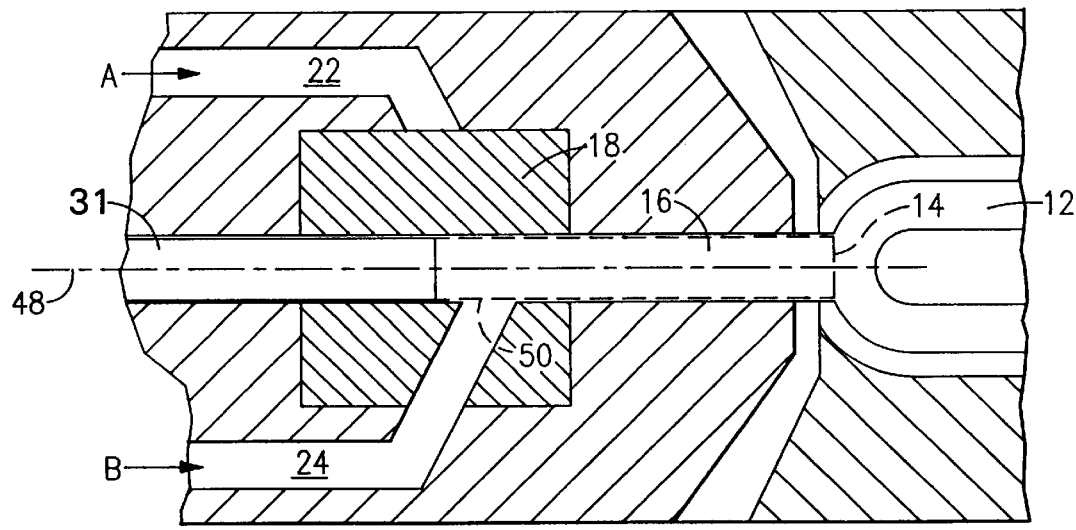

FIG. 7 illustrates a cavity arrangement 10 in which valve 18 at least partially encompasses passage 16 and pin 30 and is operated by rotation about central axis 48 of pin 30. This arrangement provides the shortest possible path for the contiguous supply of materials A and B to cavity 12 while providing for the above described operation of pin 30. As will be seen, the hot, runners 22, 24 are ported to passage 16 by way of a single port 50 controlled by valve 18. Additional hot runners could be provided for the supply of additional materials C, D, etc., to passage 16 by way of valve 18 in any desired timed metered sequence.

Figure 8:
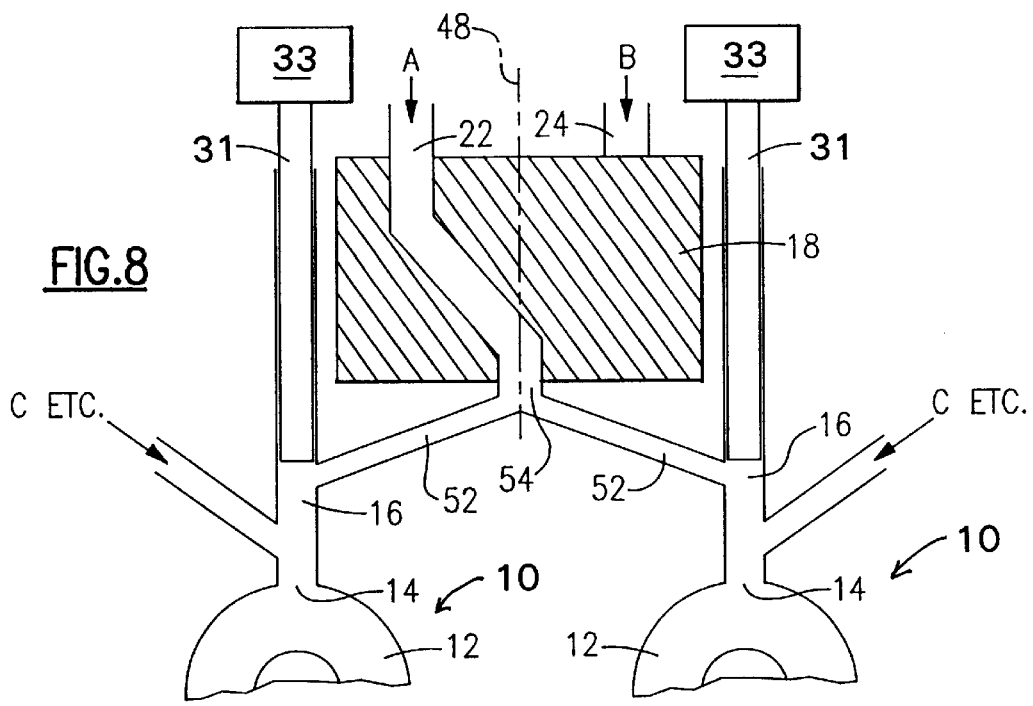

In a further embodiment as shown in FIG. 8 a plurality of cavity arrangements 10 each have a. cavity 12, gate 14 and passage 16 with a pin 30 actuated by one or more actuators 32 (two being shown, one for each of two cavities 12). As the pins 30 may operate synchronously, one actuator 32 could be used to operate a plurality of pins 30. There may be two, three, four or more cavities 12 in this plurality (depending on available space) each fed with timed metered quantities of materials A and B conveyed contiguously through hot runners 52 and passages 16 to the cavities 12 by way of gates 14. There is one hot runner 52 and one passage 16 for each cavity with all hot runners 52 being identical and all passages 16 and pins 30 being identical. The hot runners 52 are each supplied with equal timed metered contiguous quantities of materials A and B (and possible additional materials C, D, etc.) through a hub 54 from a valve mechanism 18 rotatable about axis 48 to selectively convey the materials A and B from hot runners 22, 24 sequentially in the timed metered amounts to the associated cavities.

An additional or alternatively other material or contiguous timed metered quantities of materials, etc. could be conveyed to passages 16 for contiguous supply with materials A and B to the cavities and these may be provided through a balanced hot runner system or through one or more valve mechanisms 18 in similar manner to valve mechanism 18 of FIG. 8 or with one valve serving each cavity or a plurality of valves serving groups of cavities differing from those enumerated with reference to FIG. 8.

Figure 10:
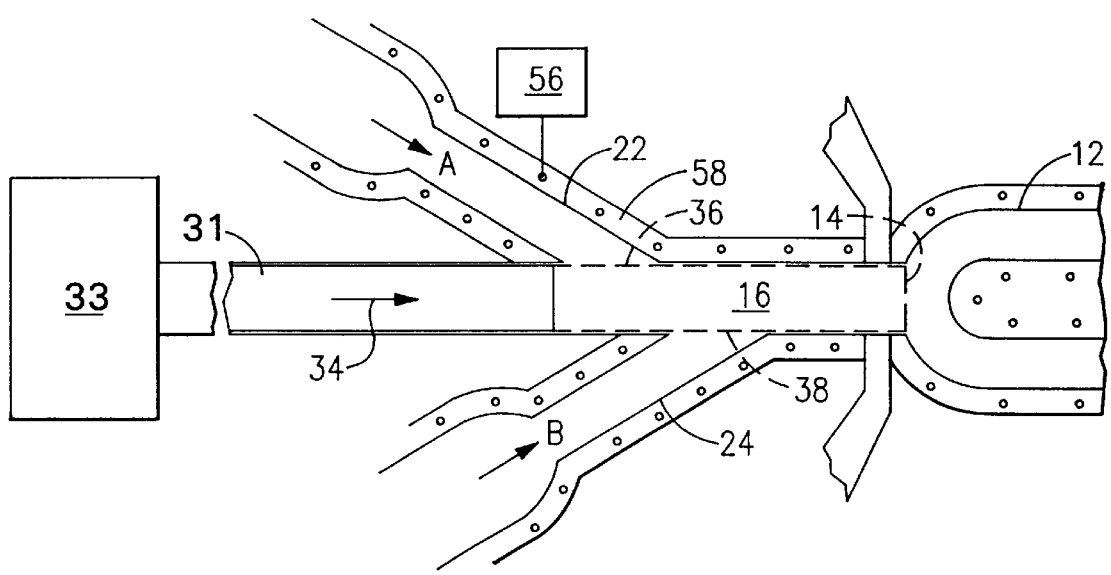
FIG. 10 is a variation of FIG. 4.

In all embodiments disclosed, it will be appreciated that passages 16 are hot runners suitably temperature controlled, as is the hot runner system 20 and hot runners 22, 24, 40, 44, 52, 54, etc. by temperature controllers 56 and appropriate insulation 58 (these being shown diagrammatically only in FIGS. 3, 4 and 10).

Figure 9:
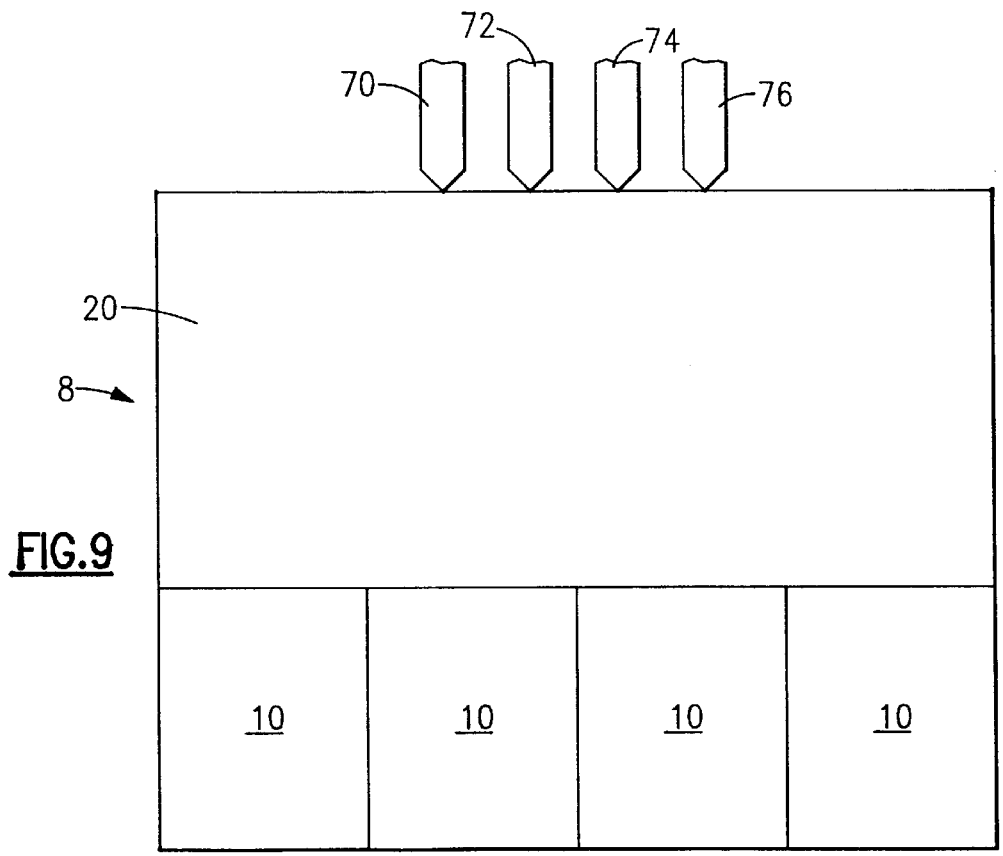
FIG. 9 is a diagrammatic illustration of a further embodiment of a mold of the present invention in which additional materials are used in the coinjection process.

Referring now to FIG. 9, four plasticizers 70, 72, 74 and 76 which may each be associated with a ram pot (not shown in FIG. 9) separately supply a plurality of up to four different materials by way of one or both of balanced and unbalanced hot runner system to supply cavities 12 of cavity arrangements 10 with time metered contiguous quantities of materials A, B, etc. in accordance with the above described embodiments.

In an embodiment employing an unbalanced hot runner and a balanced hot runner the plasticizers may provide three different materials, for example, virgin PET recycled PET and another material, such as a barrier material. Alternatively, two of the plasticizers could supply virgin PET. In either circumstance virgin PET is supplied separately by way of the unbalanced hot runner to the valve mechanisms of the assemblies 10 while the other materials are metered by a diverter valve to the balanced hot runner for contiguous flow therethrough to supply the materials simultaneously and sequentially in equal quantities to the valve mechanisms of the assemblies 10 for metering, with the virgin PET from the unbalanced hot runner, to provide the contiguous supply of the materials from the valve mechanisms of the assemblies 10. Operation of all of the valves is preferably synchronized to ensure appropriate material metering.

In the event of the material from two of the materials both being virgin PET, this arrangement can advantageously be used to supply virgin PET through an unbalanced hot runner to valve mechanisms of the assemblies 10 without any possible contamination by the recycled PET, thereby to facilitate the formation of the inner surface of a multi-later article molded in the cavities and to supply virgin and recycled PET through a balanced hot runner for use in the article where contamination of the virgin PET is less critical.

It will be appreciated that, for example, a single plasticizer could be used to supply the same material to both the unbalanced hot runner and the diverter valve of the balanced hot runner and that similar variations are possible in other embodiments. In addition the balanced hot runners may be identical, in order to balance the contiguous supply of metered material therethrough, or may be different from each other and/or controlled at different temperatures to provide desired characteristics of material flow to the cavities.

The valve mechanisms may be provided with an "off" or closed position as well as a position for the supply of each material sequentially and contiguously.

Of course it will be appreciated that diverter valve operation could be adjusted, if injection molding in different cavity groups is unbalanced thereby causing non-uniform layers and or parts from cavity group to cavity group, by sequentially operating the valves and/or changing valve timing to adjust material flow from one cavity group to another, for example, so that cavity groups that would receive the most material would have their diverter valve operation delayed to compensate and balance the flow of material to the groups.

One of the materials may be recycled PET or a barrier material e.g. ethylene vinyl alcohol (EVOH) disposed intermediate polyester layers of the article.

FIG. 10 shows a variation of FIG. 4 in which hot runners 22, 24 conveying materials A and B are increased in cross-sectional area upstream of the ports 36, 38 in order to reduce frictional effects on the material flows. A similar increase in cross-sections material supply hot runner could be utilized in other embodiments of this invention.

What is claimed is:

1. A multi cavity nozzleless coinjection mold for simultaneously producing a plurality of multi-layered articles corprising:
   a mold structure defining a plurality of mold cavities;
   a first supply source for suppling a first molding material;
   a second supply source for suppling a second molding material;
   a hot runner system in communication with said first and second supply sources for conveying metered quantities of said first and said second materials separately to a region proximate each cavity; and
   each said region comprising a nozzleless contiguous gate and adjacent passage with a reciprocal pin closely housed in the passage, the pin having only two operating positions in a first of which the pin is in a fully retracted position, in which the first and second materials conveyed in metered quantities to the proximate region are allowed to pass sequentially and contiguously through said passage and said gate to the proximate cavity, and in a second of which, at the end of each injection cycle, when the metered quantities of the first and second materials have been conveyed to the passage, the pin is moved into the gate to dose the gate, in which position the pin has ejected the first and second materials remaining in the passage, after conveyance of the metered quantities to the passage into the proximate cavity, the passage and gate having the same cross-section and size without restriction therebetween.

2. A multi-cavity coinjection mold according to claim 1 wherein the pin, passage and gate are of circular cross-section and the pin has a diametral clearance in the passage of from about 0.0005 inches (0.013 mm) to about 0.001 inches (0.025 mm).

3. A multi-cavity coinjection mold according to claim 1 comprising an actuator for providing said movement of the pin and for applying a packing pressure to the materials in the proximate cavity when the pin is in the gate closure position.

4. A multi-cavity coinjection mold according to claim 1 wherein the first supply source supplies the first molding material and a third molding material separately to a first valve mechanism for receiving said first and said third materials and operable for sequentially supplying desired timed metered quantities of said first and third materials contiguously to said passage and said first, second and third materials are conveyed in timed Amp metered quantities to each said passage for contiguous conveyance therethrough to the proximate cavity.

5. A multi-cavity coinjection mold according to claim 4 wherein there is a said first valve mechanism for each cavity and said first and third materials are conveyed contiguously through a hot runner individual to each cavity.

6. A multi-cavity coinjection mold according to claim 4 wherein the second supply source supplies the second molding material and a fourth molding material separately to a second valve mechanism for receiving said second and said fourth materials and operable for sequentially supplying desired timed metered quantities of said second and fourth materials contiguously to said passage and said first, second, third and fourth materials are conveyed in timed metered quantities to each said passage for contiguous conveyance therethrough to the proximate cavity.

7. A multi-cavity coinjection mold according to claim 6 wherein there is a said second valve mechanism for each cavity and said second and fourth materials are conveyed contiguously through a hot runner individual to each cavity.

8. A multi-cavity coinjection mold according to claim 6 wherein the first and second valve mechanisms are one in the same.

9. A multi-cavity coinjection mold according to claim 1 wherein the first and second materials are conveyed separately to a valve mechanism operable to sequentially supply timed metered quantities of said first and second materials contiguously through a plurality of identical hot runners each individual to the passage of a single cavity.

10. A multi-cavity coinjection mold according to claim 1 wherein the first and second materials are conveyed separately to a valve mechanism operable to sequentially supply timed metered quantities of said first and second materials contiguously through a plurality of identical hot runners each individual to the passages of a plurality of cavities wherein the hot runners consist of an identical balanced hot runner system for each said plurality of cavities.

11. A multi-cavity coinjection mold according to claim 1 wherein the first and second materials are conveyed separately to a valve mechanism operable to sequentially supply timed metered quantities of said first and second materials directly to the passage of a said cavity, the valveat mechanism least partially encompassing the passage and being operably rotatable about a central axis of the pin in order to sequence the materials.

12. A multi-cavity nozzleless coinjection mold for simultaneously producing a plurality of multi-layered articles comprising:

a mold structure defining a plurality of mold cavities;

a first supply source for supplying a first molding material;

a second supply source for suppling a second molding material;

a hot runner system in communication with said first and second supply sources for conveying said first and said second materials separately to a region proximate each cavity;

at least one valve mechanism per cavity for receiving said first and second materials from said hot runner system and for sequentially supplying desired quantities of said first and said second materials contiguously to a hot runner to a region proximate each cavity, wherein each hot runner communicates with a single cavity only;

each said region comprising a nozzleless contiguous gate and adjacent passage with a reciprocal pin closely housed in the passage, the pin having only two operating positions in a first of which the pin is in a fully retracted position, in which the first and second materials conveyed in metered quantities to the proximate region are allowed to pass sequentially and contiguously through said passage and said gate to the proximate cavity, and in a second of which, at the end of each injection cycle, when the metered quantities of the first and second materials have been conveyed to the passage, the pin is moved into the gate to close the gate, in which position the pin has ejected the first and second materials remaining in the passage, after conveyance of the metered quantities to the passage, into the proximate cavity, the passage and gate having the same cross-section and size without restriction therebetween, and an actuator for providing said movement of the pin and for applying a packing pressure to the materials in the proximate cavity when the pin is in the gate closure position.

13. A multi-cavity coinjection mold according to claim 12 wherein the timing control mechanism synchronizes operation of the valve mechanisms.

14. A multi-cavity coinjection mold according to claim 6 wherein the valve mechanisms each have at least three operating states, i) namely, to supply the first plastic material, ii) to supply the second plastics material, and iii) an off position.

* * * * *